US012398703B2

(12) United States Patent
Madsen et al.

(10) Patent No.: US 12,398,703 B2
(45) Date of Patent: Aug. 26, 2025

(54) SOLVATION ENTROPY ENGINE

(71) Applicant: SALTPOWER HOLDING APS, Sønderborg (DK)

(72) Inventors: Henrik Tækker Madsen, Copenhagen (DK); Lars Storm Pedersen, Farum (DK)

(73) Assignee: SALTPOWER HOLDING APS, Sønderborg (DK)

( * ) Notice: Subject to any disclaimer, the term of this patent is extended or adjusted under 35 U.S.C. 154(b) by 398 days.

(21) Appl. No.: 17/799,412

(22) PCT Filed: Feb. 17, 2021

(86) PCT No.: PCT/EP2021/053916
§ 371 (c)(1),
(2) Date: Aug. 12, 2022

(87) PCT Pub. No.: WO2021/165338
PCT Pub. Date: Aug. 26, 2021

(65) Prior Publication Data
US 2023/0093877 A1    Mar. 30, 2023

(30) Foreign Application Priority Data

Feb. 17, 2020  (DK) .................................. 202070090
May 26, 2020  (GB) ..................................... 2007801

(51) Int. Cl.
*F03G 7/00*     (2006.01)
*B01D 61/06*    (2006.01)
(Continued)

(52) U.S. Cl.
CPC ........... *F03G 7/0252* (2021.08); *B01D 61/06* (2013.01); *B01D 61/422* (2013.01);
(Continued)

(58) Field of Classification Search
CPC .......... F03G 7/005; F03G 7/0252; F03G 7/04; F03G 7/009; F03G 7/015; B01D 61/06;
(Continued)

(56) References Cited

U.S. PATENT DOCUMENTS 3,906,250 A   9/1975  Loeb
4,193,267 A   3/1980  Loeb
(Continued)

FOREIGN PATENT DOCUMENTS

CN    103615363 A     3/2014
WO    2017/149101     9/2017
(Continued)

OTHER PUBLICATIONS

Search Report from the Intellectual Property Office of the United Kingdom for Application No. GB2007801.0, mailed Oct. 30, 2020, 4 pages.
(Continued)

*Primary Examiner* — Loren C Edwards
(74) *Attorney, Agent, or Firm* — Jackson Walker LLP; Christopher J. Rourk

(57) ABSTRACT

A power generation process is disclosed, the process comprises dissolving a solute (10) into an unsaturated stream (140) to produce a high concentration stream (130) and converting latent mixing energy present in a high concentration input stream (130) into power by passage through a power unit (20) in which the concentration of the high concentration input stream (130) is reduced. The process comprises using a reduced concentration output stream (140) derived from the high concentration input stream (130) following passage through the power unit (20) as the unsaturated stream (140). A first fraction of the high concentration stream (130) is passed to the power unit (20) for use as the high concentration input stream (130) and a second fraction of the high concentration stream (130) is output from the process.

20 Claims, 10 Drawing Sheets

(51) Int. Cl.
    *B01D 61/42* (2006.01)
    *B01D 61/44* (2006.01)
    *F03G 7/04* (2006.01)
    *F04F 13/00* (2009.01)

(52) U.S. Cl.
    CPC .......... *B01D 61/445* (2013.01); *F03G 7/015* (2021.08); *F03G 7/04* (2013.01); *F04F 13/00* (2013.01); *B01D 2313/246* (2013.01)

(58) Field of Classification Search
    CPC ............... B01D 61/422; B01D 61/445; B01D 2313/246
    See application file for complete search history.

(56) References Cited

U.S. PATENT DOCUMENTS

| | | | | |
|---|---|---|---|---|
| 4,283,913 | A * | 8/1981 | Loeb | F03G 7/005 126/714 |
| 2002/0178723 | A1* | 12/2002 | Bronicki | F01K 17/04 60/671 |
| 2010/0282656 | A1 | 11/2010 | Cath et al. | |
| 2020/0158096 | A1 | 5/2020 | Madsen et al. | |

FOREIGN PATENT DOCUMENTS

| | | | | |
|---|---|---|---|---|
| WO | 2017/149102 | | 9/2017 | |
| WO | 2019/011991 | | 1/2019 | |
| WO | 2019/011992 | | 1/2019 | |
| WO | WO-2019011991 A1 | * | 1/2019 | ............. F03G 7/005 |

OTHER PUBLICATIONS

Notification of Transmittal of the International Search Report and the Written Opinion of the International Search Authority—The European Patent Office—for International Application No. PCT/EP2021/053916 mailed May 14, 2021, 14 pages.

Helfer, et al., "Osmotic power with Pressure Retarded Osmosis: Theory, performance and trends—A review", Journal of Membrane Science, 453, (2104), pp. 337-358.

Schaetzle, et al., "Salinity Gradient Energy: Current State and New Trends", Engineering, vol. 1, Issue 2, 2015, pp. 164-166.

* cited by examiner

SOLVATION ENTROPY ENGINE

RELATED APPLICATIONS

The present application claims benefit of and priority to International Application No. PCT/EP2021/053916, filed Feb. 17, 2021, which claims priority to and benefit of United Kingdom Patent Application No. 2007801.0, filed May 26, 2020 and Denmark Patent Application No. PA202070090, filed Feb. 17, 2020, each of which is hereby incorporated by reference for all purposes, as if set forth herein in its entirety.

FIELD OF THE INVENTION

The present invention concerns a process for the harvesting of solvation entropy using a solvation entropy engine. More particularly, but not exclusively this invention concerns a process for the generation of power (for example electricity) that makes use of such a solvation entropy engine and a system and/or device for use in such a process.

BACKGROUND OF THE INVENTION

When two solutions that each have a different concentration of a solute are mixed the entropy of the system is increased. If this increase in entropy (the mixing energy) can be harvested, it can be used for useful work.

One way in which some of this mixing energy may be captured is the process known as pressure retarded osmosis (PRO). In this process, a semipermeable membrane is used to separate a less concentrated solution from a more concentrated solution. The membrane allows solvent to pass from the less concentrated solution (with low osmotic pressure) to the more concentrated solution (with high osmotic pressure) by osmosis, and this leads to an increase in pressure on the side of the membrane to which the solvent diffuses due to the increased volume in the confined space. This pressure can be harnessed to generate electricity. Heifer et al, J. Membrane Sci. 453 (2014) 337-358 is a review article describing PRO. However, PRO can only be used with fluids (i.e. liquids or gases).

Another way in which some of this mixing energy may be captured is the process known as reverse electrodialysis (RED). In this process, ion exchange membranes are used to separate the less concentrated solution from the more concentrated solution. Each membrane allows positively or negatively charged ions to pass from the more concentrated solution to the less concentration solution.

Movement of the charged ions across the membranes gives rise to an electrical potential that can be used to generate electricity. However, like PRO, RED can only be used with fluids.

PRO and RED are both examples of salinity gradient energy (SGE) devices. It would be advantageous to increase the efficiency of PRO, RED and other SGE devices.

The present invention seeks to mitigate the above-mentioned problems. Alternatively or additionally, the present invention seeks to provide an improved process and apparatus for the generation of power, more particularly electricity.

SUMMARY OF THE INVENTION

The present invention provides a power (for example an electricity) generation process comprising dissolving a solute into an unsaturated stream to produce a high concentration stream and/or converting latent mixing energy present in a high concentration input stream into power (for example electricity) by passage through a power unit in which the concentration of the high concentration input stream is reduced, for example by mixing with a low concentration input stream. The process may further comprise using an output stream derived from said high concentration input stream following passage through the power unit as the unsaturated stream. It may be that a first fraction of the high concentration stream is passed to the power unit for use as the high concentration input stream and a second fraction of the high concentration stream is output from the process, for example as a high concentration outlet stream. So, processes in accordance with the present invention may allow for the production of a stream of high concentration fluid, for example for use in industrial processes, while recirculating a portion of the high concentration stream for use in dissolving the solute, the concentration of the high concentration stream having been reduced by passage thorough a power unit before it is returned to the solute.

When a solute is dissolved by a solvent to produce a solution the entropy of the system is increased. By recirculating the high concentration/reduced concentration output stream via a power unit in which latent mixing energy is converted into a useful form (referred to herein as power), for example electricity, it may be possible to capture at least some of this solvation entropy. Thus, the present process may increase the energy efficiency of processes for producing high-concentration solutions by capturing some of this solvation entropy.

Outputs from the process are power (for example electricity), a high concentration stream (the second fraction of the high concentration stream) and, optionally, an outlet stream derived from the low concentration input stream (it being possible to combine this stream with the reduced concentration outlet stream for use as the unsaturated stream). Inputs to the process are solute and a low concentration stream. The process may be considered as operating a solvation entropy engine. Outputs and inputs of the process may be considered to be outputs and inputs at the (theoretical) boundary of the solvation entropy engine. Thus (and without wishing to be bound by theory) it is believe that the recirculation of the output stream derived from high concentration stream to dissolve the solute creates a solvation entropy engine that can be viewed as analogous to a heat engine.

Thus, processes in accordance with the present invention modify the process for dissolving a solute in a solvent to produce a high concentration output stream to provide a solvation entropy engine that can harvest some of the mixing energy released when the solute is dissolved in the solvent. This is in contrast to, for example, prior art SGE processes which only harvest the entropy generated by the mixing of the high and low salinity streams. On such example prior art process is described in CN 103615363 in which a salt difference power generation device uses concentrated brine and seawater as high-concentration and low-concentration side solutions, respectively, to realize salt difference power generation. However, the process of CN103615363 uses a concentrating device to evaporate the solvent from the diluted high-concentration stream after passage through the power generation device. Thus, the on-going process of CN103615363 fails to capture the solvation entropy generated when salt is dissolved in the solution.

The amount of the high concentration stream output as the second fraction may be set so as to keep the volume of fluid within the (high concentration side of the) process constant and/or the process in a steady state. For example, in normal operation, the flow rate of the second fraction of the high concentration stream output from the process may be substantially equal to the increase in the volume of the high concentration stream as a result of passage through the power unit. Thus, it may be that in a PRO process (see below) the flow of the second fraction of the high concentration stream output from the process equals the flow through the membrane from the low concentration input stream. Thus, output of the second fraction of the high concentration stream may allow the process of the present invention to remain in operation for long periods of time.

Additionally or alternatively, because the low concentration stream is used to reduce the concentration of the high concentration stream rather than being directly added to the solute a wider variety of sources can be used for the low concentration stream.

The solute may be in solid form. The solute may be a salt, sugar or other soluble substance. The solute may be any solute that dissolves in the solvent. The solvent may be water, or any other suitable solvent. The terms high(er)-concentration and low(er)-concentration are used herein to refer to streams having a corresponding content of the solute. Throughout this specification low concentration should be understood to include zero concentration. The solute concentration of the high concentration may be anything up to saturation. The high concentration stream may be a slurry (a saturated solution with undissolved particles).

Where the solute is salt, the high concentration and low concentration streams may be referred to as high salinity and low salinity streams respectively. It will be understood that the saline streams produced by dissolving salt may contain a wide variety of dissolved salts, comprising or with a preponderance of sodium chloride, potassium chloride and/or calcium chloride. "salt content" refers to total salt content. The exact nature of the salt(s) present in such streams is not important. Similarly, the terms high(er)-salinity and low(er)-salinity are used herein to refer to streams having a corresponding "salt content"—the exact nature of the salt(s) present in such streams is not important.

The salt content of the high concentration stream may be anything up to saturation. Preferably the salt content is at least 10% wt, preferably at least 15% wt, preferably at least 20% wt, especially at least 25% wt.

The low concentration stream may be obtained from any source, but is typically sea water, fresh or brackish water obtained, for example, from a river or a lake, or waste water obtained from an industrial or municipal source. The low concentration stream may be passed to the power unit for use as the low concentration input stream.

The process comprises a mixing step in which the concentration of an unsaturated stream is increased by dissolving a solute therein and a power generation step in which latent mixing energy is converted into power (for example electricity) in a power unit. The steps of the process may be carried out simultaneously. The process may comprise operating a solvation entropy engine to dissolve a solute to produce a high concentration stream and produce useful work (e.g. electricity). Operating the solvation entropy engine may comprise carrying out the mixing step and the power generation step.

The inputs to the mixing step are an unsaturated stream and solute, optionally in solid form. It will be understood that the properties of the unsaturated saline stream must be such that the solute will dissolve into the unsaturated stream.

An output from the mixing step is a high concentration stream. It will be appreciated that the concentration of the solute in the high concentration stream is greater than the concentration of the solute in the unsaturated stream. The concentration of the solute in the high concentration stream may be anything up to saturation.

The process may comprise converting latent mixing energy present in a first fraction of said high concentration stream into power (for example electricity) by passage through the power unit, while a second fraction of said high concentration stream is output from the process (and/or the solvation entropy engine). The process may comprise splitting the high concentration stream into first and second fractions, wherein the first fraction passes through the power unit (as the high concentration input stream) and using the second fraction of the stream elsewhere, for example in an industrial process. The process may comprise splitting the high concentration stream into first and section fractions upstream of the power unit.

The process may comprise passing the reduced concentration output stream through an energy recovery device in which energy from said stream is transferred to the high concentration input stream, for example to increase the pressure of the high concentration input stream. The energy recovery device (ERD) may comprise a pressure exchanger. The ERD may comprise a pump, for example a booster pump configured to maintain a constant output from the ERD in the event the pressure in the reduced concentration output stream varies.

It may be that the method comprises simultaneously (i) increasing the pressure of the high concentration input stream prior to mixing with the low concentration input stream and (ii) decreasing the pressure of the reduced concentration output stream, for example by passage through a pressure exchanger in which pressure is transferred from the output stream to the high concentration input stream. It may be that the flow rate of the output stream passed to the pressure exchanger is equal to the flow rate of the high salinity input stream immediately prior to mixing with the low salinity input stream. Use of such a pressure exchanger may increase the efficiency of the process.

The process comprises a power generation step in which latent mixing energy present in said high concentration input stream is converted into useful work (power, for example electricity) by passage through the power unit. A power unit is a unit which converts latent mixing energy into power, for example electricity. Any suitable power unit may be used in the process of the present invention. The inputs to the power generation step will be a low concentration input stream and a high concentration input stream. After passage through the power unit, the concentration of the high concentration input stream will be reduced and the concentration of the low concentration input stream will be increased. Passage of the high concentration input stream through the power unit may comprise passing the high concentration input stream over a membrane, for example a semi-permeable membrane that permits the passage of water in a PRO process, or a semi-permeable membrane that permits the passage of ions having a particular charge in a RED process.

The power unit may comprise a semi permeable membrane. The semi permeable membrane may permit the passage of particular atoms and/or molecules contained in the high or low concentration input streams and prevent the passage of other atoms and/or molecules. Thus, the high and low concentration input streams may mix during passage through the power unit as atoms and/or molecules pass between the streams thereby leading to a change in concentration of the streams. The power unit may be configured to generate electricity from this mixing, for example by doing mechanical work and/or providing an electrical potential.

An output stream from the power unit will be derived from the original high concentration input stream. Such an output stream may comprise at least part of the original high concentration input stream its concentration having been reduced by passage through the power unit (hence this stream may be referred to as a reduced concentration output stream). This stream is used as the unsaturated stream. The reduced concentration output stream may comprise the high concentration stream (or a first part thereof) and solvent (e.g. water) from the low concentration stream. This would be the case if PRO (see below) is used. Alternatively, for example if RED (see below) is used the reduced concentration output stream may comprise the high concentration stream (or a first part thereof) from which at least some of the cations and anions have been removed.

One output stream from the power unit may be a waste stream, for example derived from the low concentration input stream. The waste stream may have higher concentration than the low concentration input stream. The waste stream(s) may be disposed of as required, for example by discharge into a neighbouring sea, river or lake. Depending on the permissible discharge concentration into the neighbouring body of water, the parameters (for example the number of membranes and/or osmotic units) in the power unit can be varied until the allowable solute concentration is obtained in the waste stream. The waste stream (or at least part thereof) may be combined with the output stream derived from the high concentration stream and passed to the solvent as the unsaturated stream. This may be advantageous where disposal of the waste stream is difficult.

It may be that the process comprises converting latent mixing energy present in said high concentration input stream into power, for example electricity, by passage through the power unit (a first power unit) and a second power unit and optionally a third or further power units. The power units may be arranged in parallel and/or in series. The high concentration input stream may be split and passed to the power unit and the second and/or further power units. Additionally or alternatively, the reduced concentration output stream after passage through the power unit may be used as the high concentration input stream in a second power unit (an so on for the third and further units if present). The output stream of the first and/or second power unit (and third and/or further power units if present) derived from the high concentration stream for that unit may be used as part of the unsaturated stream to dissolve the solute. In the case that the output from a power unit is recirculated to dissolve the solute the power unit may be considered to be inside the boundary of the solvation entropy engine. In that case that the output from a power unit is not recirculated to the solute as part of the unsaturated stream such a power unit may be considered to be outside the boundary of the solvation entropy unit.

It may be that the process comprises converting latent mixing energy present in said high concentration stream into electricity by passage through a salinity gradient energy (SGE) power unit in which power (for example electricity) is produced using the difference in concentration between a high concentration input stream and a low concentration input stream.

The power unit may convert latent osmotic energy present in said high concentration stream into power (for example electricity) by Pressure Retarded Osmosis (PRO). Thus, the power unit may be an osmotic power unit. It may be that the osmotic power unit comprises a semi-permeable membrane which permits the passage of water but not the passage of salts (or other solutes), and said high concentration input stream is passed over one side of the semi-permeable membrane, the low concentration input stream being passed over the other side of said membrane.

PRO may be an efficient and effective process for capturing the solvation energy generated when salt (or another solute) is dissolved by the unsaturated stream. Additionally and/or alternatively, using a semi-permeable membrane may allow for use of a lower quality aqueous feed stream and/or remove the need for additional filtering steps as the aqueous feed stream is filtered by passage through the membrane before reaching the solute.

It will be appreciated that, in a PRO unit, the passage of the solvent to the more concentrated solution reduces the concentration of that solution. Thus, in the present invention, the concentration of the high concentration stream may be reduced by passage through the osmotic power unit thereby producing an unsaturated stream that can be sent back to dissolve the solute.

Semi-permeable membranes for use in PRO are commercially available, and any suitable membrane may be used. More than one membrane may be present, and combinations of different types of membranes may be used. Thus the osmotic power unit may contain more than one osmosis unit, each osmosis unit containing a semi-permeable membrane. As well as at least one membrane, an osmotic power unit may include means for converting pressure or flow generated by osmosis into electricity.

Typically this means will be a turbine connected to a generator, but any suitable device may be used. Alternatively, the osmotic power unit may convert the increased pressure of the high concentration input stream into useful work directly, for example mechanically.

An osmotic power unit of this type can also be seen as an entropy harvester. Solvent flows from the low concentration input stream to the high concentration input stream thereby increasing (or generating) entropy which may then be harvested by using the increased pressure of the high concentration stream to generate electricity, for example via a turbine.

In the case that solvent crosses the semi-permeable membrane from the low concentration input stream to the high concentration stream, for example as in a PRO process, it may be that the flow rate of the second fraction of the high concentration stream (e.g. the portion of the high concentration stream output from the process) is equal to the flow rate of solvent across the membrane. In this way, the process can be maintained in equilibrium for prolonged periods, allowing it to run on a long term basis and, for example, to be used in the production of high concentration streams for use in industrial processes.

In the case that a semi-permeable membrane is used in the osmotic power unit, it may be the solvent passes through the membrane of the osmotic power unit before being used to dissolve the salt or other solute. It may be that once the process is underway new solvent is only added to the solute after passing through the semi-permeable membrane of the osmotic power unit.

The output streams from a first pass over a semi-permeable membrane will both have lower concentration than the original high concentration input stream and higher concentration than the original low concentration input stream. At equilibrium, the two streams would have equal concentration, but this is unlikely to be achieved in practice. Therefore, either output stream can be reused as either the first stream or the second stream for a second pass over the same membrane, or as either the first stream or the second stream over another membrane. These reused streams may be used alone, or merged with other input streams. The osmotic power generation process may be a multistep process, each step comprising passage of a relatively high concentration stream and a relatively low concentration stream over a membrane in an osmotic power unit. Each step may have a different pressure and/or flux setting depending on the difference in concentration between the initial input streams for each pass. Tailoring the pressure and/or flux setting in this manner may increase the efficiency of the process. As long as an outgoing stream from an osmosis unit has higher concentration than the initial low concentration stream, it is possible to operate an additional osmosis unit. The optimal number of cycles will depend on the initial content of the streams, the efficiency of the membranes, and the flow rates selected.

The osmotic power unit may contain more than one osmosis unit, each osmosis unit comprising a membrane. The output from each osmosis unit will be a first outgoing stream from a first (initial higher concentration) side of the membrane and a second outgoing stream from a second (initial lower concentration) side of the membrane. These streams may be handled separately or at least partially merged.

The process may comprise pressurising the high concentration stream, for example by passage through an energy recovery device (ERD) or pump, to a pressure below the osmotic pressure difference between the high and low concentration input streams, before passing the high concentration input stream over the semi-permeable membrane.

In the case that the process uses a pressure exchanger, it may be that a first part of the reduced concentration output stream from the osmotic power unit is passed through the pressure exchanger and a second part of the output stream is passed through a turbine in the osmotic power unit. It may be that electricity is generated by expansion of the second part of the output stream during passage through the turbine. The first part of the output stream may be used as the unsaturated stream to dissolve the solute after passing through the pressure exchanger. The second part of the output stream may be used as the unsaturated stream to dissolve the solute after passing through the turbine.

The process may comprise recombining the first and second parts of the reduced concentration output stream after passage through the pressure exchanger and the turbine respectively for use as the unsaturated stream. As discussed above, it may be that a second fraction of the high concentration stream is diverted away from the osmotic power unit (i.e. does not pass through the power unit). This second fraction of the high concentration passes out of the solvation entropy engine as a high concentration outlet stream. The flow rate of the high concentration outlet stream may be equal to the rate of flow of solvent through the semi-permeable membrane (i.e. the difference in flow rate between the streams derived from the high concentration input stream and the low concentration input stream respectively at outlet from the power unit).

Alternatively, it may be that the full amount of the low concentration input stream is used within the solvation entropy engine. The remainder of the low concentration stream on exit from the osmotic power unit may be recombined with the reduced concentration output stream (for example after splitting and passage through the pressure exchanger and the turbine). The flow rate of the second part of the high concentration stream may be equal to the rate of flow of the low concentration stream at entry to the osmotic power unit and/or semi-permeable membrane.

It will be appreciated that water will flow from the low concentration input stream to the high concentration input stream across the semi-permeable membrane as long the pressure applied to the high concentration solution is lower than the difference in osmotic pressure. Where saturated sodium chloride is used as the high salinity stream, the osmotic pressure can be more than 400 bar.

It may be that the low concentration stream is pressurised using a feed pump prior to passage through the osmotic power unit.

The power unit may convert latent mixing energy present in said high concentration input stream into electricity by Reverse ElectroDialysis (RED). Thus, the power unit may be an electrodialysis power unit. Such a power unit may comprise a stack of ion exchange membranes located between an anode and a cathode. Each ion exchange membrane is either a cation exchange membrane (permits the passage of cations but not anions) or anion exchange membrane (permits the passage of anions but not cations). Thus each ion exchange membrane is a semi-permeable membrane permitting the passage of ions with a negative charge or ions with a positive charge. The stack comprises a plurality of units, each unit comprising (in order) a high-salinity (or concentration) channel, a cation exchange membrane (CEM), a low salinity (or concentration) channel, and an anion exchange membrane (AEM). In use, cations from the high concentration channel pass through the CEM to the low concentration channel of the same unit, while anions from the high concentration channel pass through the AEM of the adjacent unit into the low concentration channel of an adjacent unit. This flow of ions can be used to generate an electric current. By way of example, where the solute of the present process comprises sodium chloride, positively charged sodium ions will pass through the CEM from the high salinity input stream to the low salinity input stream and negatively charged chlorine ions will pass through the AEM from the high salinity input stream to the low salinity input stream. Thus, the concentration of a high concentration input stream is reduced by passage through the electrodialysis power unit to produce an unsaturated stream that can be sent back to dissolve the solute.

It may be that the electrodialysis power unit comprises a cation exchange membrane and an anion exchange membrane. The high concentration input stream is passed over one side of the cation exchange membrane and one side of the anion exchange membrane, a first low concentration input stream being passed over the other side of the cation exchange membrane and a second low concentration input stream being passed over the other side of the anion exchange membrane. The power unit may comprise a plurality of cation exchange membranes arranged in an alternating stack with a plurality of anion exchange membranes. The stack may be located between an anode and a cathode.

RED may be an efficient and effective process for capturing the solvation energy generated when salt (or another solute) is dissolved by the unsaturated solution. Additionally and/or alternatively, use of RED may reduce the freshwater requirement of the electricity generation process in comparison to processes in which concentration of the high concentration stream is reduced by dilution.

The process may comprise a step of transporting the solute to the location in which the process is carried out. The process may comprise a step of extracting the solute from an underground formation, for example a salt dome, before dissolving the solute in the unsaturated stream. Thus, the process may comprise transporting the solute to the location in which the process is carried out and then dissolving the solute with the unsaturated stream in a compartment of the power generation system.

In a second aspect of the invention there is provided a power generation system comprising a solute, a power unit and/or a high concentration outlet. The power unit may be configured to generate power (for example electricity) using the difference in concentration between a high concentration input stream and a low concentration input stream thereby producing a reduced concentration output stream derived from the high concentration input stream (e.g. an output stream derived from the high concentration stream). The high concentration outlet may be configured to allow a high concentration stream to exit the power generation system. It may be that the system is arranged the system is arranged such that the reduced concentration output stream is used to dissolve the solute, and a first fraction of the resulting high concentration stream is passed to the power unit for use as the high concentration input stream and a second fraction of the resulting high concentration stream is passed to the high concentration outlet.

It may be that the system is arranged such that the high concentration input stream is used as the high concentration input stream of a second and/or further power unit. Additionally or alternatively, the reduced concentration output stream from the power unit may be used as the high concentration input stream to a second or further power unit. Thus, the power generation system may comprise two or more power units (i.e. the power unit, a second power unit and one or more further power units) arranged in parallel and/or series. The reduced concentration output stream from the power unit, the second power unit and/or any further power unit (if present) may be used to dissolve the solute.

It may be that the solute is salt and the power unit is configured to generate power (for example electricity) through a Salinity Gradient Energy (SGE) process using the difference in salinity between the high-salinity input stream and the low salinity input stream. It will be appreciated that the present invention is not restricted to solutes that are salts, in which case references herein to salt and salinity in connection with SGE, PRO and RED may be taken as referring also to solute and concentration respectively.

It may be that the power unit is an osmotic power unit arranged to generate power (for example electricity) through Pressure Retarded Osmosis (PRO) using the difference in salinity between the high salinity stream and the low salinity stream. The osmotic power unit may comprise a semi-permeable membrane which permits the passage of water but not of dissolved salts (or solute). The system may be arranged so that the high salinity stream passes over one side of the semi-permeable membrane and the low salinity stream passes over the other.

It may be that the power unit is an electrodialysis power unit arranged to generate electricity through Reverse Electrodialysis (RED) using the difference in salinity between the high saline stream and the low salinity stream. The power unit may comprise a stack of ion exchange membranes located between an anode and a cathode. Each ion exchange membrane is either a cation exchange membrane (permits the passage of cations but not anions) or anion exchange membrane (permits the passage of anions but not cations). The stack comprises a plurality of units, each unit comprising (in order) a high-salinity channel, a cation exchange membrane (CEM), a low salinity channel, and an anion exchange membrane (AEM).

The apparatus (the power generation system) may comprise a compartment for mixing the solute and the unsaturated stream. The compartment may be configured to receive the solute, for example the solute in solid form.

The system may comprise a feed pump, pressure exchanger and/or any other element described in relation to the process of the first aspect.

It will be understood that the process of the present invention may be described as a power (or electricity) generation process because the power unit produces power (for example electricity). It will be appreciated that the amount of power (for example electricity) produced will vary depending on the process parameters.

Methods that can be used to extract mixing energy are collectively known as salinity gradient energy (SGE) technologies, but will from hereon be called Entropic Energy Extraction Devices (EEEDs). EEEDs function by facilitating a controlled mixing of two solutions with a relatively high concentration, from hereon the draw solution, and relatively low concentration, from hereon the feed solution. EEEDs operate on liquid or gaseous solutions, which means that they can only be used for extraction of the mixing energy released during dilution, and so far, it has not been possible to extract the entropy of solvation generated when solids dissolve into solution.

In a further aspect of the invention there is provided a device for extraction of the free energy from solvation entropy, said device comprising a mixing system and a power unit (also referred to herein as an Entropic Energy Extraction Device or EEED) where the EEED as input is fed a solution and a draw solution, and the mixing system as input is feed a solid and a diluted draw solution, where the draw solution is an output from the mixing system and the diluted draw solution is an output from the EEED being a mix of the draw solution and the feed solution.

It may be that a first fraction of the output draw solution from the mixing system is sent to the EEED and a second fraction is directed out of the device.

It may be that the second fraction is fed as input to an additional EEED.

It may be that the EEED is formed of several sub-units positioned in succession such that a first sub-unit in the succession is fed with draw solution from the mixing system but subsequent sub-units, are fed output diluted draw solution from the prior sub-unit, in the succession.

It may be that diluted draw solution from some of the sub-units, in addition to being fed to the next sub-unit in the succession, is recirculated back to the mixing system.

It may be that solid is sent to the mixing system directly to create a draw solution for the EEED.

It may be that the EEED is a pressure retarded osmosis (PRO) device comprising a semi-permeable membrane.

It may be that draw solution is pressurized at a pressure below the osmotic pressure difference between the two solutions before being sent to the membrane.

It may be that the pressurization is done with an energy recovery device (ERD), such as a pressure exchanger or a pump.

It may be that the expansion of the pressurized solution in the membrane is directed to an energy generating device such as a turbine.

It may be that the draw solution output from the mixing system is split in two, where one part is directed to the pressure exchanger in the PRO system and the other is directed out of the device.

In a further aspect of the invention there may be provided a method to harvest entropic energy from a solid, said method including a device comprising a mixing system and an Entropic Energy Extraction Device (EEED) (also known as a power unit), said method including to input to the EEED as feed a solution and a draw solution, and to the mixing system as feed a solid and a diluted draw solution, where the draw solution is an output from the mixing system and the diluted draw solution is an output from the EEED being a mix of the draw solution and the feed solution.

It may be that the EEED is a pressure retarded osmosis (PRO) device comprising a semi-permeable membrane, said method including the draw solution to be pressurized at a pressure below the osmotic pressure difference between the two solutions before being send to the membrane.

It may be that the method includes the expansion of the pressurized solution in the membrane to be directed to an energy generating device.

It will of course be appreciated that features described in relation to one aspect of the present invention may be incorporated into other aspects of the present invention. For example, the method and/or process of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

In many cases it is necessary to dissolve solids into solution. In this process, atoms or molecules locked in the solid will interact with the solvent and move out into the solution as dissolved species. The change from a system consisting of two relatively pure phases, a solid (s) and a solvent (aq), to a mixed solution will give an increase in entropy (S).

$$\Delta S = S_{A(aq)}^\theta - S_{A(s)}^\theta$$

Where S is entropy, solid, solvent-solvent and solid-solvent interactions, enthalpy may either increase, decrease or stay unchanged, which can lead to further changes in entropy as heat is either added or removed from the system. As long as the net change in entropy is positive, the dissolution process will be spontaneous.

The entropy generation is available as Gibbs free energy, in this case called mixing energy as described by the following equation:

$$-\Delta G_{mix} = RT([\Sigma x_i \ln(\alpha_i)]_M - \phi_A[\Sigma x_i \ln(\alpha_i)]_A - \phi_B[\Sigma x_i \ln(\alpha_i)]_B)$$

where $G_{mix}$ is the Gibbs free energy of mixing, R is the gas constant, T the absolute temperature, $x_i$ the mole fraction of species "i", a, the activity of species "i" and $\phi_A$ and $\phi_B$ are the ratios of moles in solutions A and B respectively to the total moles in the system, solutions A and B being mixed to give solution M.

Figure 1:
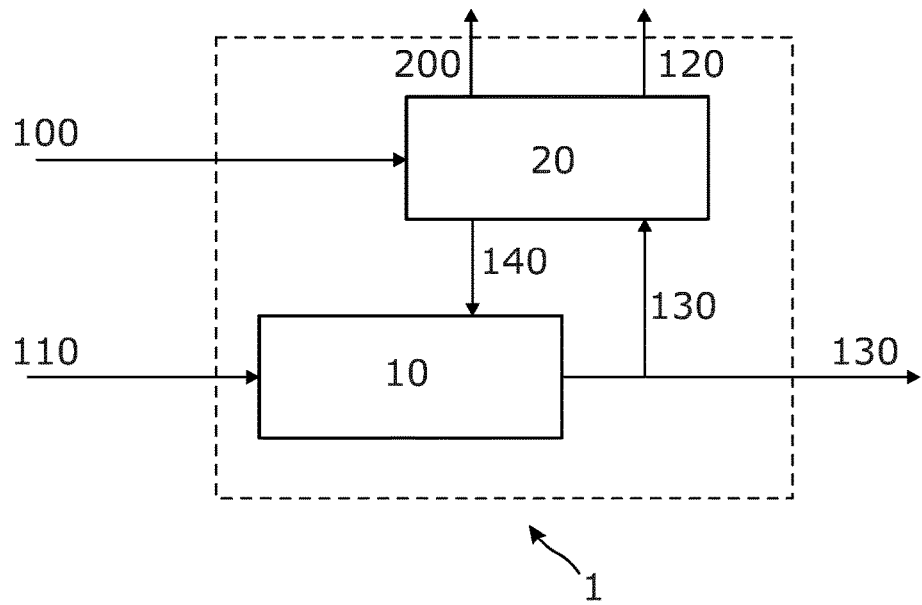
FIG. 1 shows an example solvation entropy engine in accordance with the present invention.

One example embodiment of the invention is illustrated schematically in FIG. 1. The inputs to a power unit (or EEED) 20 are a draw solution 130 and a suitable feed solvent solution 100. The power unit 20 produces power 120 and a diluted draw solution 140, which is a mix of the inputted draw solution 130 and feed solvent solution 100. The diluted draw solution 140 is sent to a mixing system 10 together with solids 110. The draw solution 130 is the output of the mixing system 10 when the solid 110 is mixed with and thus dissolved by the outputted diluted draw solution 140 from the power unit 20. The diluted draw solution 140 is the inputted draw solution 130 outputted with a lowered solution concentration. The boundary of the resulting theoretical device 1 for the extraction of solvation entropy is denoted by a dashed line in FIG. 1.

To have a steady state process with constant volume, part of the output draw solution 130 is sent out of the device 1, said output draw solution 130 being of a relatively high concentration. The overall device 1 thus operates with inputs of solids 110 and a solution of relatively low concentration (feed solvent solution 100) and outputs of power/energy 120, an output draw solution 130 of relatively high concentration. Said device 1 is called a solvation entropy engine FIG. 1 further shows a possible departure of a residual solvent 200 being a left over solvent 100 after passage through the power unit 20, the flow rate of which may be controlled to adjust the fluids within the device 1. In some embodiments all of feed solvent solution 100 is used within the device 1.

In the present context, the solvent solution 100 is a fluid, for example a liquid or gas, with a low (or zero) concentration of solutes (e.g. sugar or salts like Sodium Chloride, Potassium Chloride, Calcium Chloride etc.) and, optionally, fresh water or other solvent. The solid 110 is to be understood as the solute in a solid state. In other embodiments the solute may be in a non-solid state. The solvent solution 100 is in a low concentration state compared to the solid 110. The diluted draw solution 140 and solids 110 in the mixing system 10 mix and create a solution of relatively high concentration (the draw solution 130) as the solids 110 dissolve in the diluted draw solution 140.

Figure 2:
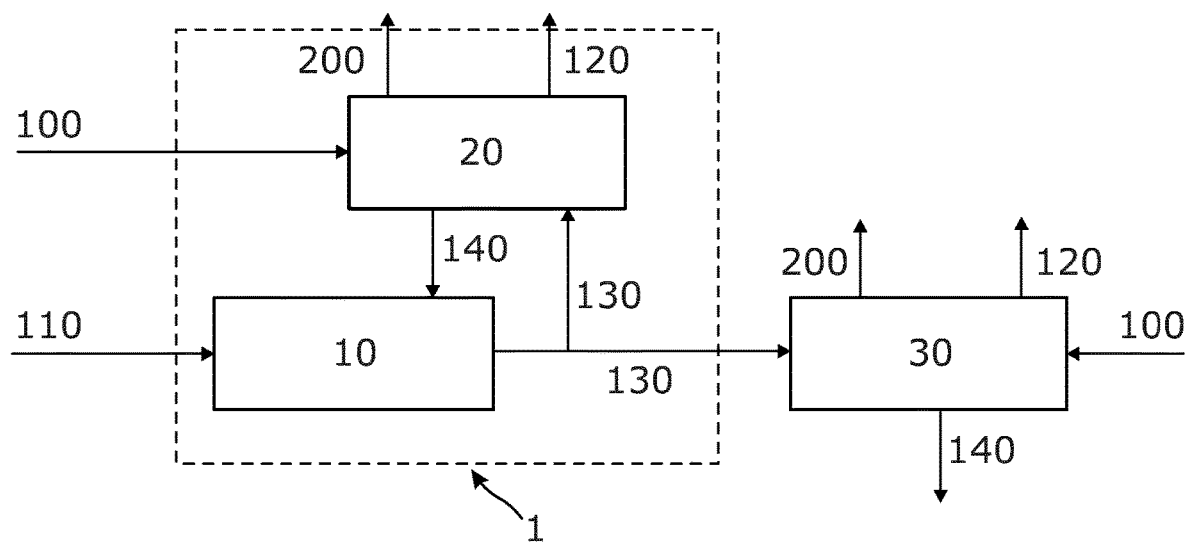
FIG. 2 shows a variant of the process of FIG. 1 where the produced high concentration solution is used in a further power unit.

The output draw solution 130 of relatively high concentration can be used for secondary purposes. FIG. 2 illustrates an embodiment where an additional power unit 30 (of the same type as power unit 20, within the device 1) is added to the output draw solution 130 stream of the system of FIG. 1. In this embodiment the draw solution 130 is diluted by a suitable solvent feed solvent 100 in the additional power unit 30 to produce a diluted draw solution 140 and, optionally, a residual solvent solution 200. The additional power unit 30 is positioned outside the device 1 and may consist of several additional power sub-units 30 operating on different parameters. The power unit 20 placed in the device 1 may also consist of several sub-units within the device 1, such as illustrated in FIG. 3.

Figure 3:
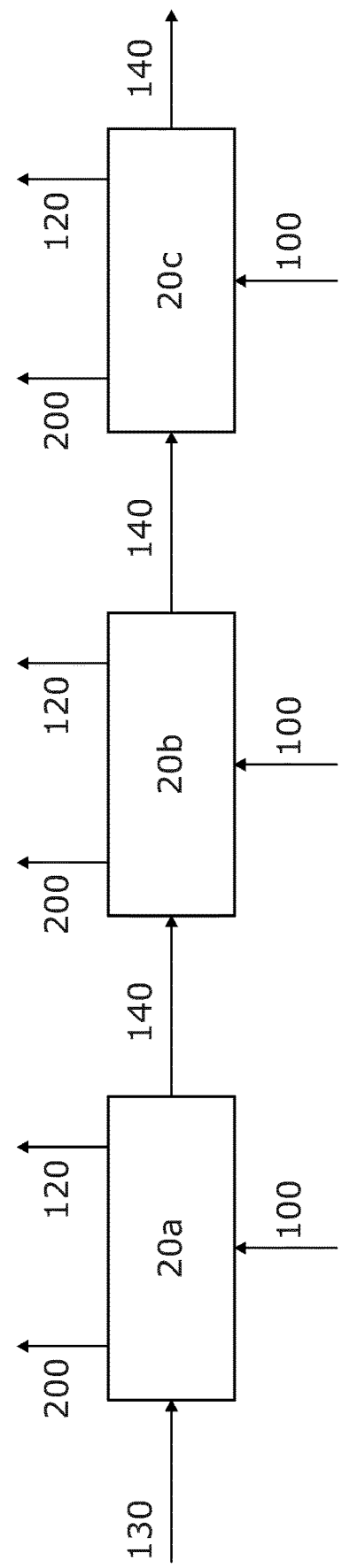
FIG. 3 shows a variant of the process of FIG. 1 in which multiple power units are connected in series.

FIG. 3 illustrates an embodiment of such a series of power sub-units 20a, 20b, 20c, each sub units having the same input and output streams as the power unit 20 described above. A first power sub-unit 20a feeds a diluted draw solution 140 to the second power sub-unit 20b that feeds diluted draw solution 140 the a third power sub-unit 20c. Though the figure illustrates three such power sub-units 20a, 20b, 20c, the device 1 could include any number of power sub-units in succession.

Figure 4:
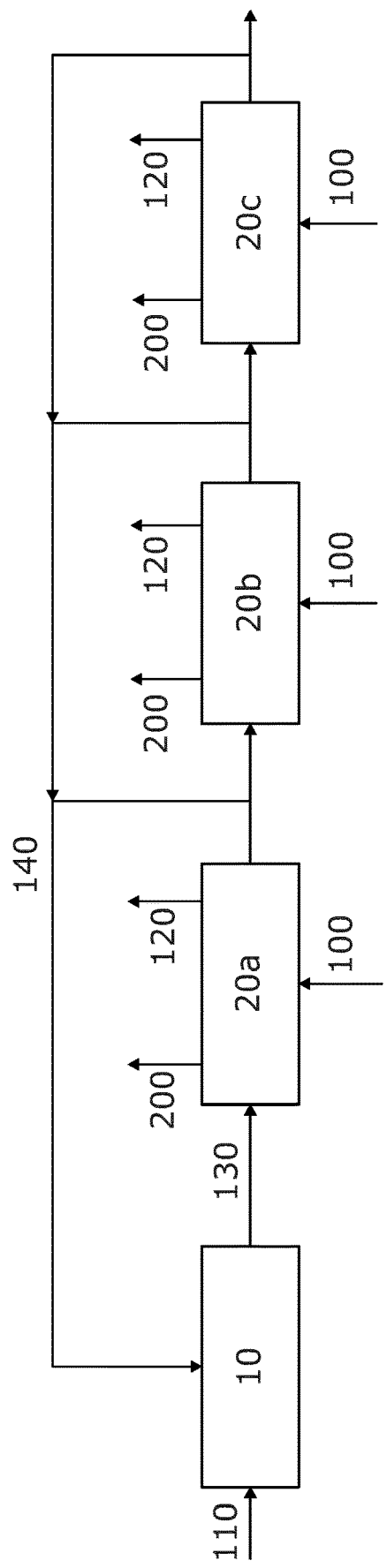
FIG. 4 shows a variant of the process of FIG. 1 in which multiple power units are connected in series within the solvation entropy engine.

FIG. 3 describes a way of connecting power sub-units in series, where each subunit can operate at similar or different conditions. If a series of power sub-units 20a, 20b, 20c are used for energy extraction, recirculation may follow from any (or all) of them as shown in FIG. 4. In FIG. 4, a portion of the diluted draw solution 140 from each power sub-unit 20a, 20b, 20c is passed to the mixing system 10. Any such power sub-unit from which recirculation occurs will be within the (theoretical) boundary of the solvation entropy engine device 1, while others (from which recirculation does not occur) will be outside.

Figure 5:
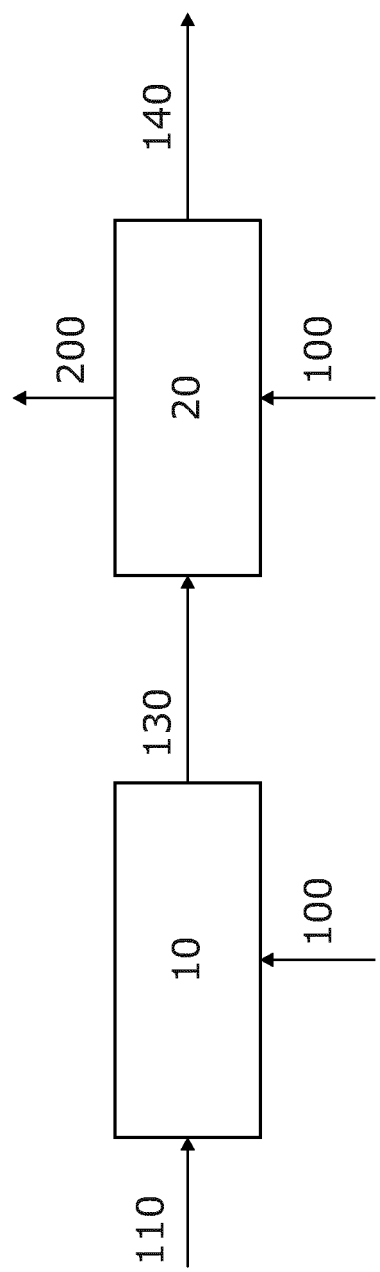
FIG. 5 shows a system with no recirculation of the high concentration solution to the mixing system.

In FIG. 5 a system with no recirculation is shown. The system of FIG. 5 is a comparative example falling outside the scope of the present invention. Here feed solvent 100 is sent to the mixing system directly to create a draw solution 130 for the power unit 20. The mixing of the feed solvent 100 with the solids 110 in the mixing system 10 leads to an increase in entropy, but because this mixing is not mediated via a power unit (in contrast to the system of FIG. 1) it is uncontrolled, and therefore, the increase in entropy cannot be used for energy generation. From FIG. 5 it can also be seen that feed solvent 100 is sent to both the mixing system 10 and the power unit 20. More feed solvent 100 is thus required to run the process. Furthermore, the outlet of the process in FIG. 5 is a dilute draw solution 140 flow of lower concentration than the outlet draw solution 130 in FIG. 1.

Figure 6:
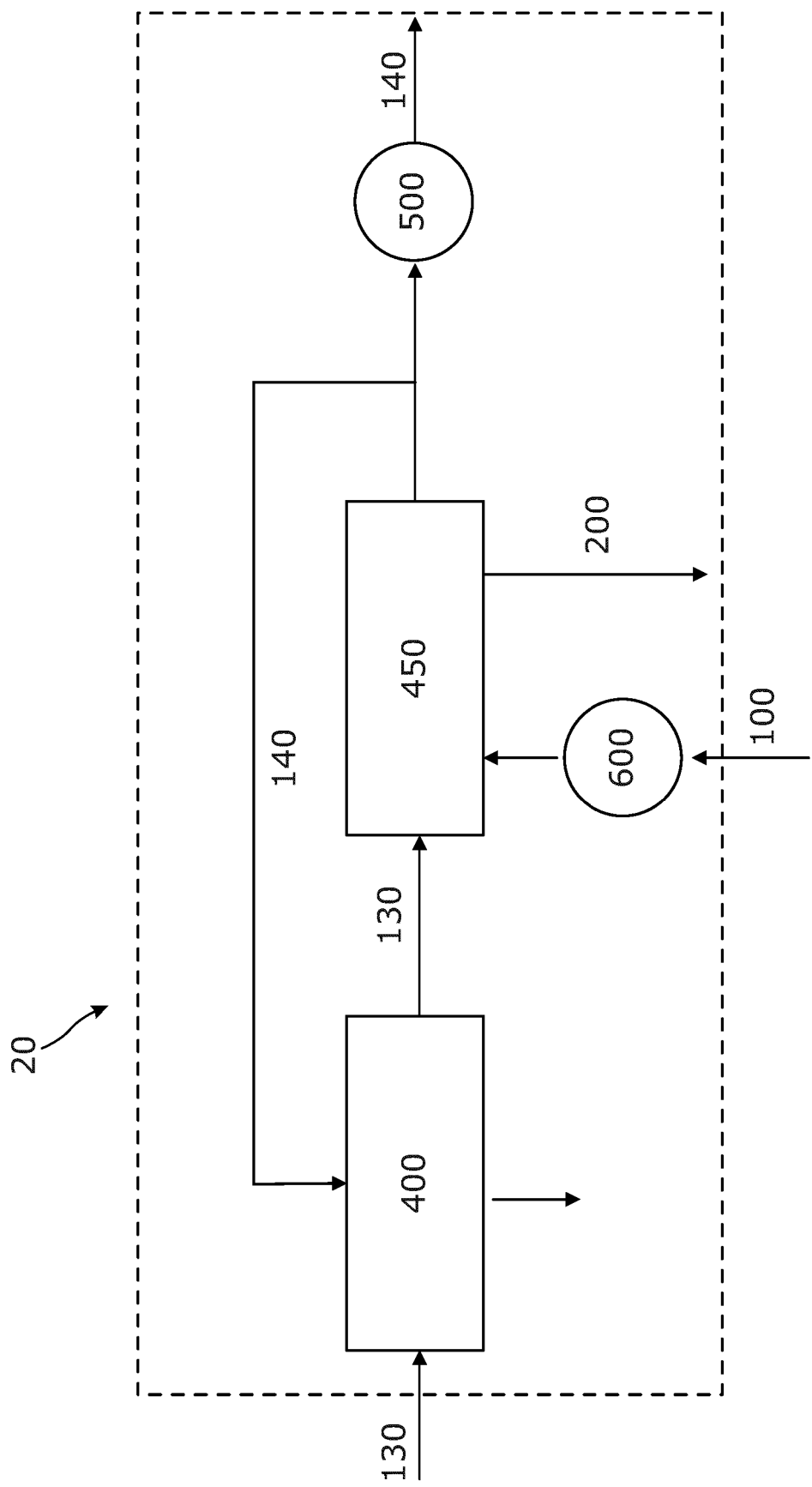
FIG. 6 shows an example osmotic power unit.

In one example, the power unit 20 is an osmotic power unit as illustrated in FIG. 6 which generates electricity through pressure retarded osmosis (PRO). In PRO two liquid solutions of different concentration; draw solution 130 and feed solvent solution 100, being high concentration and low concentration solutions respectively, pass either side of a semi-permeable membrane 450 which permits the passage of water but not of salts. Due to the net difference in osmotic pressure, solvent permeates the membrane 450 and moves from low to high concentration to try and equalize the osmotic difference. This leads to an expansion of draw solution 130, which can be sent to an energy generating device 500 such as a turbine. The draw solution 130 is pressurized at a pressure below the osmotic pressure difference between the draw solution 130 and feed solvent solution 100 before being sent to the semi-permeable membrane 450 by passage through a pressure exchanger 400. In the same or yet further embodiments, a pump may be used to pressurise the draw solution 130 before it is passed to the semi-permeable membrane. A fraction of diluted draw solution 140 is recirculated to the pressure exchanger 400 as the high pressure stream and pressure is transferred from the diluted draw solution 140 to the draw solution 130 in the pressure exchanger 400. In yet further embodiments, the pressure exchanger or pump may be absent. A feed pump 600 pressurises the feed solvent solution 100 before it is sent to the semi-permeable membrane 450.

Figure 7:
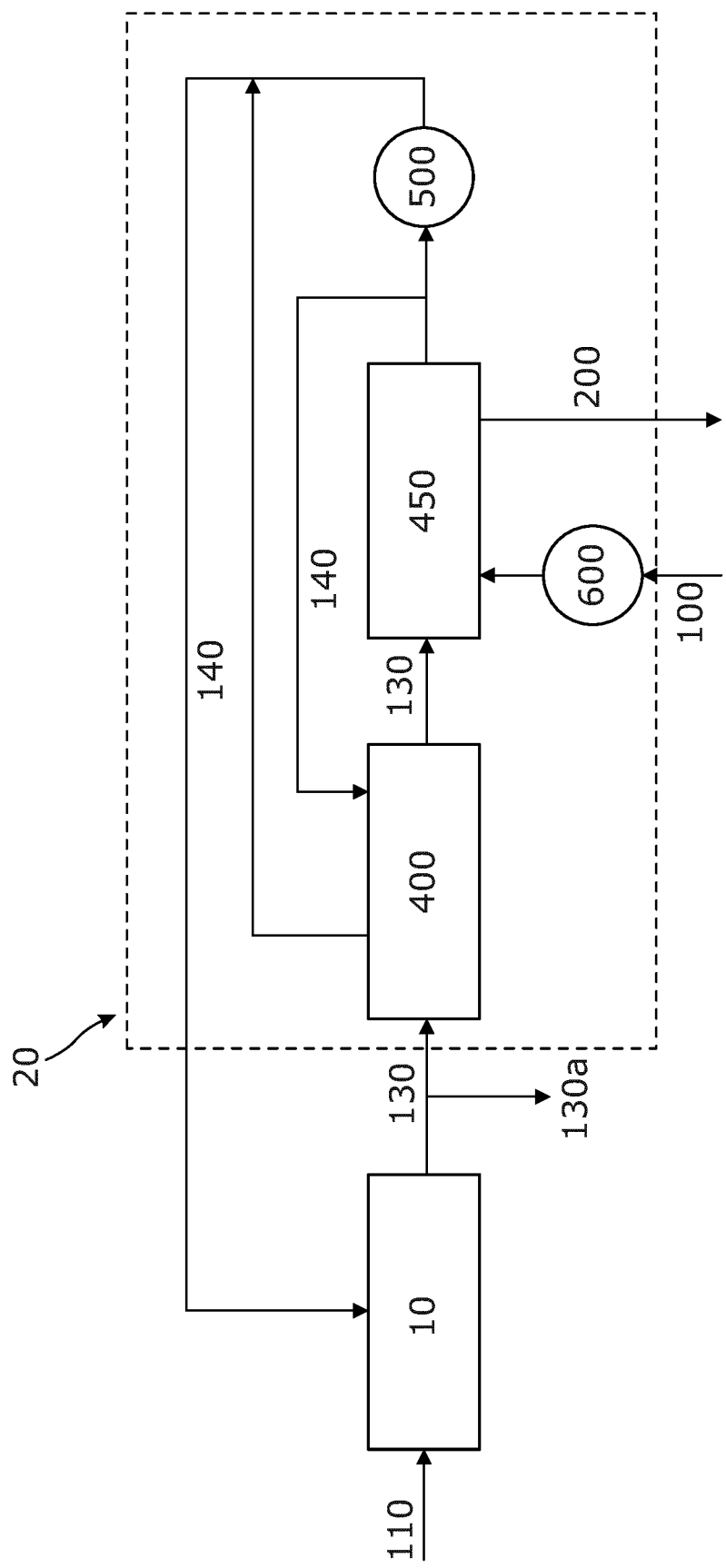
FIG. 7 shows an example process in accordance with the invention in which the osmotic power unit of FIG. 6 is used to harvest mixing energy.

FIG. 7 shows a solvation entropy engine device 1 based on PRO. Here solids 110 (for example salt) are sent to a mixing system 10 where they mix with the dilute draw solution 140 coming from the power unit 20 and create a draw solution 130 of relatively high concentration. This draw solution 130 is split into two fractions; one is directed to the pressure exchanger 400 in the power unit 20 and the other (130a) is directed out of the solvation entropy engine device 1. In this embodiment, the flow of draw solution (130a) directed out of the solvation entropy engine device 1 equals the permeate flow of feed solution 100 through the membrane 450, that is to say V_130a=V_100−V_200. After passage through the pressure exchanger 140 and energy generating device 500 the two streams of diluted draw solution 140 are recombined before re-entering the mixing system 10.

Figure 8:
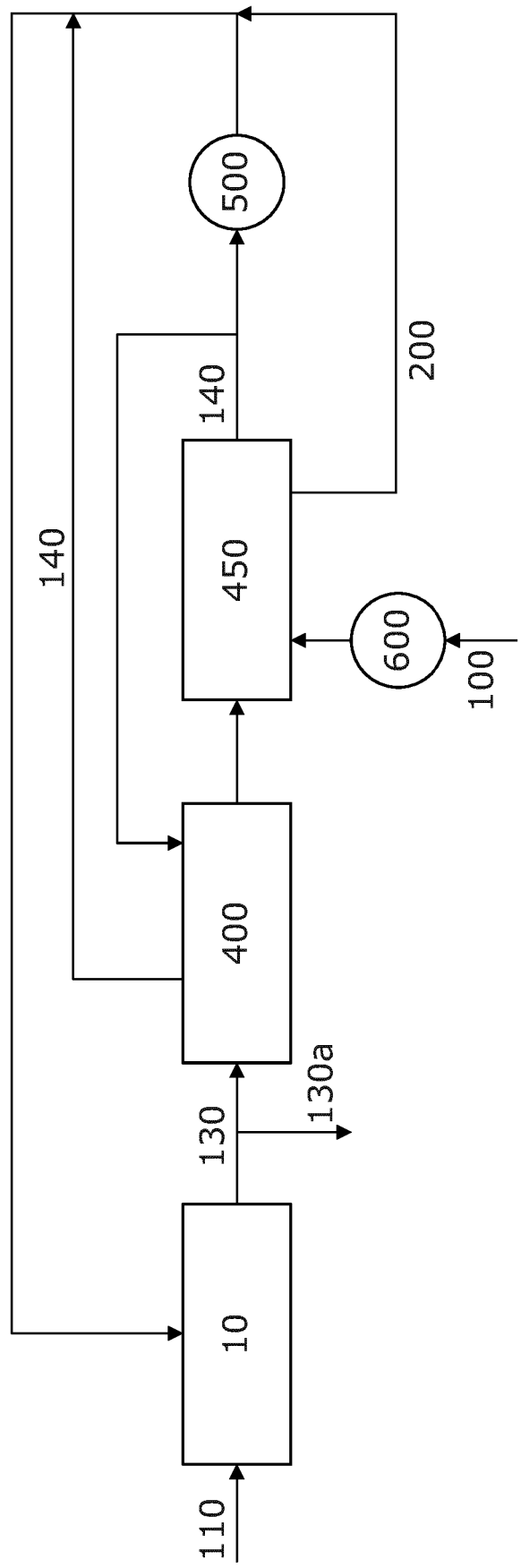
FIG. 8 shows a variant of the process of FIG. 7.

In order to utilize the full amount of the feed solution 100, the residual solvent 200 stream can be mixed together with the diluted draw solution 140 from the energy generating device 500 and the pressure exchanger 400, such as in the embodiment seen in FIG. 8. In this system, the flow of the draw solution (130a) directed out of the solvation entropy engine device 1 equals the inflow of the feed solution to the membrane 450, that is to say, V_130a=V_100.

In some cases, it is not necessary to transport the solids 110 to the mixing system 10. If the solids 110 themselves form a structure that can be used as a mixing system 10, dilute draw solution 140 can be recirculated directly to this. This may be the case where the solids are in an underground formation, for example a salt dome or rock salt layer.

In order to maximize energy generation from solvation entropy, it may be beneficial to operate the PRO process at the highest possible pressure, as the gross energy of the process is the product of the flow of permeate across the semi-permeable membrane 450 in the PRO process and the applied pressure.

$$E_{gross} = V_{solvent,permeate} \cdot P_{applied}$$

In the PRO process the limiting maximum pressure will be the osmotic pressure of the draw solution. When the applied pressure is increased, less feed solution 100 can permeate the membrane 450 relative to the draw solution 130 flow rate. To maintain the permeate flow, it will therefore be necessary to increase the draw solution 130 flow rate. This increase in draw solution 130 flow rate may be handled by the pressure exchanger 400, and efficiency losses in this process will mean there is an optimum applied pressure where net energy is maximized. Net energy in this context is defined as $$E_{net} = E_{gross} - EDG_{loss} - ERD_{loss} - FP_{loss}$$

Where EGDloss, ERDloss and FPloss are the losses incurred in the energy generation device 500, the energy recovery device (for example pressure exchanger 400) and the feed pump 600 respectively.

Figure 9:
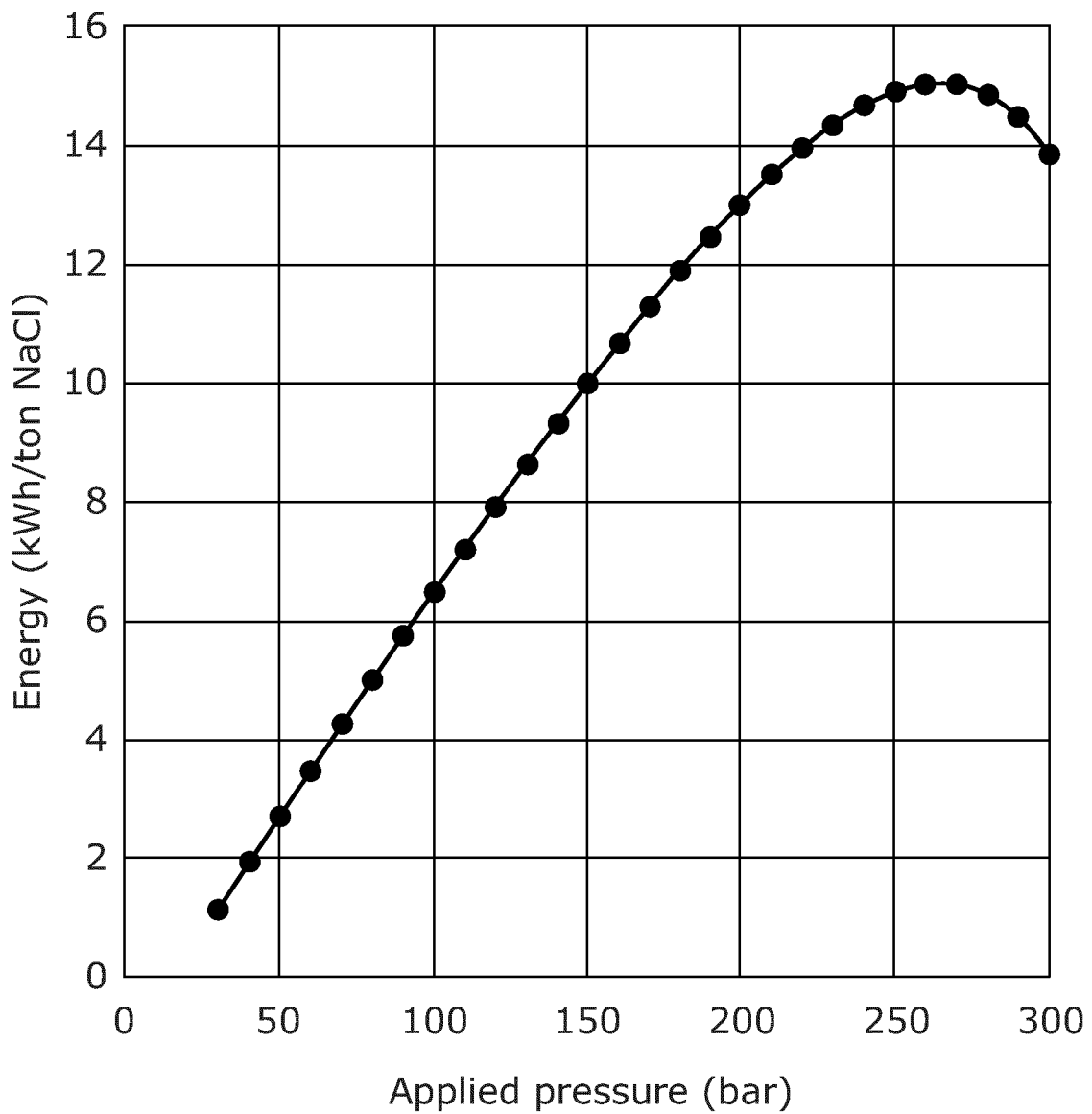
FIG. 9 shows a plot of the energy produced per ton of NaCl (sodium chloride) as this goes into solution as a function of applied pressure when a PRO process is used to extract the energy.

FIG. 9 shows an example of such an optimum applied pressure. Here the solid 110 is sodium chloride (NaCl) and the solution 100 is water. A turbine is used as the energy generating device 500, and a pressure exchanger 400 with a booster pump (not illustrated) to overcome pressure losses is used to pressurise the draw solution 130.

The turbine 500 operates at an efficiency of 90%, the pressure exchanger at an efficiency of 95%, with the booster pump operating at an efficiency of 90%. The feed pump 600 operates at an efficiency of 80%, delivering feed water to the PRO system at a pressure of 10 bar, and 90% of the feed water is utilized in the PRO process. The entropy solvation engine device 1 follows the design shown in FIG. 7. Also, the mixing ratio between solid 110 and feed solution 100 is fixed by defining the osmotic pressure of the dilute draw solution 130 coming from the outlet of the PRO process. It is fixed to 10 bar above the applied pressure ($P_{applied}$+10 bar). In this case, the increasing flow rate in the recirculation loop leads to increasing losses in the pressure exchanger, which results in an optimum applied pressure of 270 bar.

Figure 10:
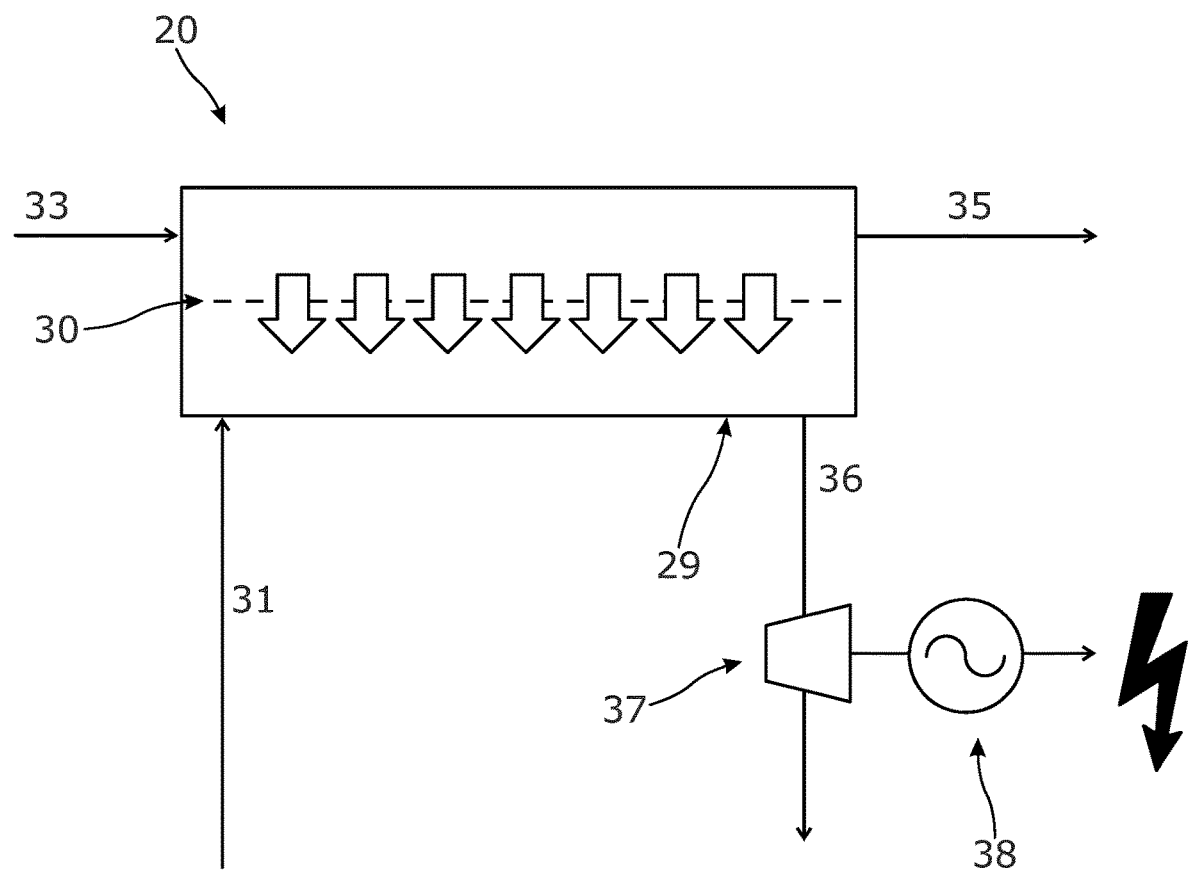
FIG. 10 shows more details of an osmotic power unit.

FIG. 10 shows more details of an osmotic power unit 20, for example of the type used in FIG. 7. A saline stream 31 (which may for example be feed stream 130 is passed to an osmosis unit 29 containing a semi-permeable membrane 30 which permits passage of water but not of salts, and flows at one side of membrane 30. An aqueous stream 33 which is of lower salinity than stream 31 (for example feed stream 100) enters osmosis unit 29 and flows at the other side of membrane 30. Arrows show the direction of water transport by osmosis across membrane 30. An output stream 35 (for example stream 200) derived from original input stream 33 and now containing a higher concentration of salt, leaves osmosis unit 29. An output stream 36 consisting of original input stream 31 now containing a lower concentration of salt (for example diluted feed stream 140), leaves osmosis unit 29 via a turbine 37 which drives a generator 38 thus producing electricity.

Figure 11:
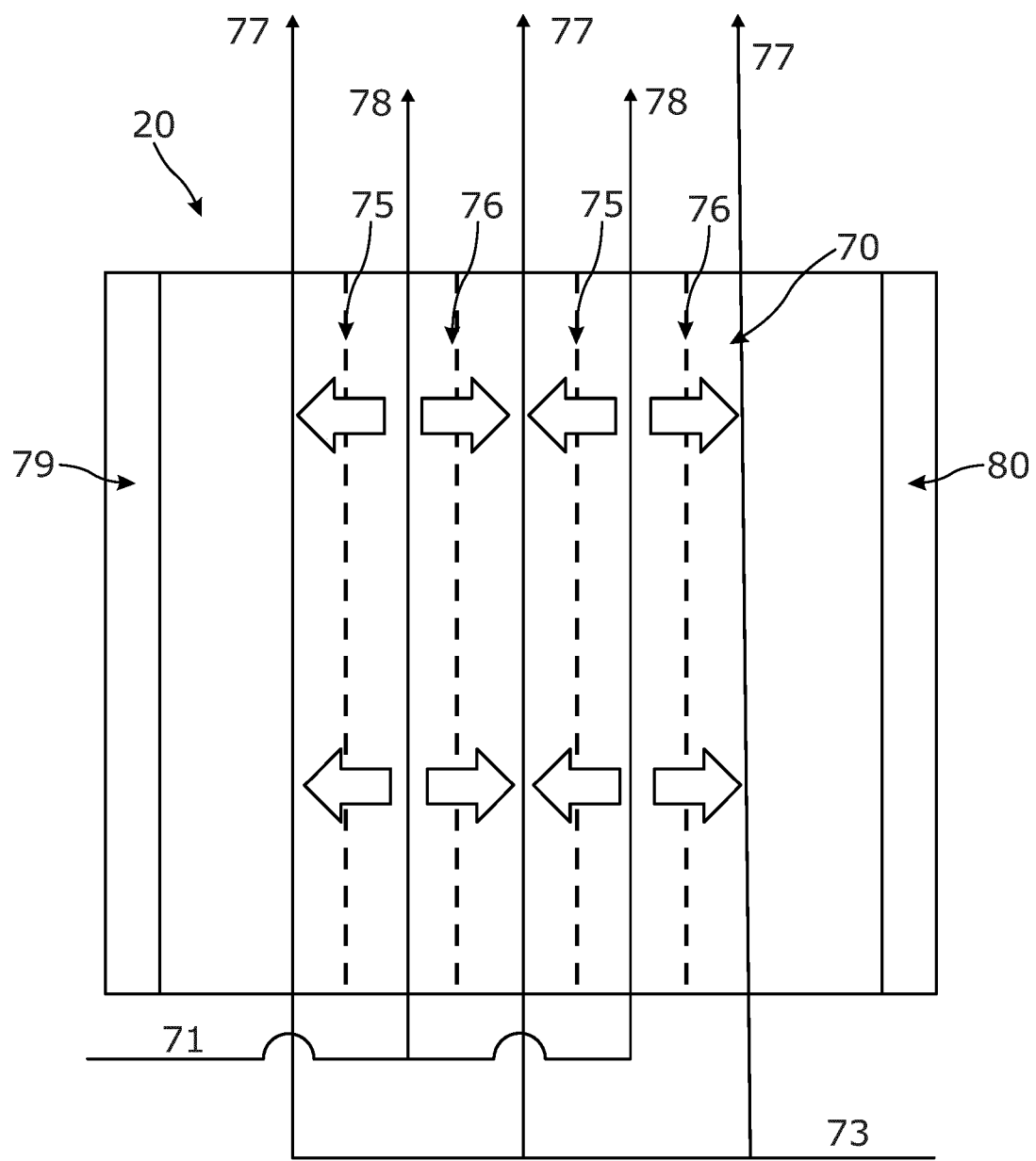
FIG. 11 shows more details of a reverse electrodyialysis power unit.

In one example, a reverse electrodialysis (RED) power unit 20 is used instead of an osmotic power unit 20 in the process of FIG. 7. An example reverse electrodialysis (RED) power unit is illustrated in FIG. 11. The RED power unit 20 comprises a stack 70 of cation exchange membranes 75 alternating with an anion exchange membranes 76. The stack 70 is located between a cathode 79 (on the left of FIG. 11) and an anode 80 (on the right of FIG. 11). A saline stream 71 (which may for example be feed stream 130) flows between each cation exchange membrane 75 (on the left of stream 71 in FIG. 11 which permits the passage of cations (e.g. sodium) but not anions (e.g. chlorine) and an anion exchange membrane 76 (on the right of stream 71 in FIG. 11). An aqueous stream 73 which is of lower salinity than stream 71 (for example feed stream 100 in FIG. 7) flows on the other side of each cation exchange membrane 75 and the anion exchange membrane 76. Thus, there is an alternating series of saline streams 71 and aqueous streams 73 flowing through the stack 70. For the sake of clarity only four membranes are shown in FIG. 11, but the stack may include many more membranes. Arrows show the direction of sodium transport across cation exchange membrane 75 and chloride transport across anion exchange membrane 76. This movement of cations and anions across the membranes generates an electric current. An output stream 77 (for example residual solvent 200) derived from original input stream 73 (feed stream 100) and now containing a higher concentration of salt, leaves the power unit 20. An output stream 78 (for example diluted draw stream 140 in FIG. 7) consisting of original input stream 71 (draw stream 130 now containing a lower concentration of salt, leaves the power unit 20.

As for PRO, the salinity of saline stream 71 (i.e. draw stream 130) is reduced and the salinity of aqueous stream 73 (feed stream 100) is increased by passage through the RED unit. However, with a RED process this is because positive and negatively charged ions (for example sodium ions and chlorine ions) have passed from the saline stream 71 to the aqueous stream 73. This movement across the cation exchange membrane 75 and anion exchange membrane 76 generates an electric potential which can be used to drive an electric current.

Both PRO and RED are examples of SGE technologies. It will be appreciated that other SGE technologies may be used in the example described above.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A power generation process comprising the steps of:
dissolving a solid solute into an unsaturated stream to produce a high concentration stream;
converting latent mixing energy present in a high concentration input stream into power by passage through a power unit in which a concentration of the high concentration input stream is reduced;
using a reduced concentration output stream derived from the high concentration input stream following passage through the power unit as the unsaturated stream into which the solute is dissolved to produce the high concentration stream; and
wherein a first fraction of the high concentration stream is passed to the power unit for use as the high concentration input stream and a second fraction of the high concentration stream is output from the process.

2. The process according to claim 1, wherein the latent mixing energy is converted into electricity by passage through the power unit.

3. The process according to claim 2, wherein the power unit is a salinity gradient energy (SGE) power unit in which electricity is produced using a difference in concentration between the high concentration input stream and a low concentration input stream.

4. The process according to claim 3, wherein the power unit is an electrodialysis power unit comprising a plurality of cation exchange membranes and a plurality of anion exchange membranes, and in which the high concentration input stream is passed over one side of a cation exchange membrane and one side of an anion exchange membrane, the low concentration input stream being passed over another side of the cation exchange membrane and another side of the anion exchange membrane.

5. The process according to claim 2, wherein a first part of said high concentration input stream is converted into electricity by passage through the power unit, a second part of said high concentration input stream being used as an input to a second power unit.

6. The process according to claim 5, wherein the unsaturated stream comprises a reduced concentration output stream derived from the second part of said high concentration input stream after passage through the second power unit.

7. The process according to claim 1, wherein an amount of the high concentration stream output as the second fraction is varied so as to keep a volume of fluid within the process substantially constant.

8. The process according to claim 1, wherein the power unit is an osmotic power unit comprising a semi-permeable membrane which permits a passage of water but not a passage of salts, said high concentration input stream is passed over one side of the semi-permeable membrane, and a low concentration input stream being passed over another side of said semi-permeable membrane.

9. The process according to claim 8, wherein a flow of the second fraction of the high concentration stream output from the process equals a flow through the semi-permeable membrane from the low concentration input stream.

10. The process according to claim 8, wherein the high concentration input stream is pressurized by passage through a pressure exchanger, a pump or other suitable energy recovery device (ERD) before being passed over said semi-permeable membrane.

11. The process according to claim 1, wherein at least part of the reduced concentration output stream derived from the high concentration input stream following passage through the power unit is used as a high concentration input stream for a second power unit.

12. The process according to claim 11, wherein the reduced concentration output stream derived from the high concentration input stream after passage through the power unit and/or the second power unit is used as the unsaturated stream.

13. The process according to claim 1, wherein the process comprises transporting the solute to a location in which the process is carried out and, optionally, extracting the solute from a salt dome or other suitable underground formation before transporting the solute to the location at which the process is carried out.

14. A power generation system comprising:
   a solute;
   a power unit configured to generate power using a difference in concentration between a high concentration input stream and a low concentration input stream thereby producing a reduced concentration output stream derived from the high concentration input stream;
   a high concentration outlet; and
   wherein the system is configured to dissolve a solid solute with the reduced concentration output stream to produce a high concentration stream, and a first fraction of the high concentration stream is passed to the power unit for use as the high concentration input stream and a second fraction of the resulting high concentration stream is passed to the high concentration outlet.

15. The power generation system according to claim 14, wherein the power unit is configured to generate electricity using the difference in concentration between the high concentration input stream and the low concentration input stream.

16. The power generation system according to claim 14, wherein the power unit is an osmotic power unit arranged to generate electricity through Pressure Retarded Osmosis (PRO) or an electrodialysis power unit arranged to generate electricity through Reversed ElectroDialysis (RED).

17. The power generation system according to claim 16, wherein the osmotic power unit comprises a semi-permeable membrane which permits a passage of water but prevents a passage of salts and the system further comprise an energy recovery device (ERD),
   wherein the system is arranged such that the high concentration input stream is pressurized by passage through the ERD before being passed to the semi-permeable membrane, and
   wherein a pressure of the reduced concentration output stream is reduced by passage through the ERD before being used to dissolve the solute, the ERD being configured to transfer pressure from the reduced concentration output stream to the high concentration stream.

18. The power generation system according to claim 14, wherein the system is arranged such that the high concentration stream is used as a high concentration input stream of a second and/or further power unit, or the reduced concentration output stream from the power unit is used as a high concentration input stream to the second and/or further power unit.

19. The power generation system according to claim 18, wherein the reduced concentration output stream from the power unit, the second power unit and/or the further power unit is used to dissolve the solute.

20. The power generation system according to claim 14, comprising a compartment in which the reduced concentration output stream is used to dissolve the solute.

* * * * *